(12) United States Patent
Schmalz et al.

(10) Patent No.: US 11,454,230 B2
(45) Date of Patent: Sep. 27, 2022

(54) CYLINDER PISTON FOR AN AIR COMPRESSOR

(71) Applicant: AMK Holding GmbH & Co. KG, Kirchheim/Teck (DE)

(72) Inventors: Jan Schmalz, Stuttgart (DE); Christine Reich, Hattenhofen (DE); Philipp Schaible, Römerstein Böhringen (DE)

(73) Assignee: AMK Holding GmbH & Co. KG

( * ) Notice: Subject to any disclaimer, the term of this patent is extended or adjusted under 35 U.S.C. 154(b) by 70 days.

(21) Appl. No.: 16/943,324

(22) Filed: Jul. 30, 2020

(65) Prior Publication Data
US 2021/0033084 A1 Feb. 4, 2021

(30) Foreign Application Priority Data

Jul. 31, 2019 (DE) .................... 10 2019 120 730.4

(51) Int. Cl.
| | |
|---|---|
| *F04B 39/00* | (2006.01) |
| *F04B 39/12* | (2006.01) |
| *F16K 15/14* | (2006.01) |
| *F16K 15/16* | (2006.01) |
| *F04B 53/12* | (2006.01) |

(52) U.S. Cl.
CPC .......... *F04B 39/0016* (2013.01); *F04B 39/12* (2013.01); *F04B 53/123* (2013.01); *F04B 53/125* (2013.01); *F04B 53/127* (2013.01); *F16K 15/14* (2013.01); *F16K 15/1402* (2021.08); *F16K 15/16* (2013.01); *F16K 15/162* (2021.08)

(58) Field of Classification Search
CPC .... F04B 39/0016; F04B 39/12; F04B 53/123; F04B 53/125; F04B 53/127; F16K 15/1402; F16K 15/16; F16K 15/162; F16K 15/14
See application file for complete search history.

(56) References Cited

U.S. PATENT DOCUMENTS

| | | | | |
|---|---|---|---|---|
| 54,881 A | * | 5/1866 | Fogg | ............ F04B 39/0016 417/550 |
| 1,362,838 A | * | 12/1920 | Brandt | ............ F04B 53/123 417/549 |

(Continued)

FOREIGN PATENT DOCUMENTS

| | | |
|---|---|---|
| DE | 2 311 048 A1 | 9/1974 |
| DE | 44 29 097 A1 | 2/1996 |
| DE | 103 30 366 A1 | 1/2005 |

*Primary Examiner* — Christopher S Bobish
(74) *Attorney, Agent, or Firm* — Dinsmore & Shohl LLP

(57) ABSTRACT

A cylinder piston for an air compressor, in particular for a two-stage air compressor, has at least two channel openings integrated in the piston surface of the cylinder piston, which are designed as an inlet valve and/or as an outlet valve for air in a compression chamber of the cylinder. A coherent, one-piece and flexible bending sealing element is provided inside or covering the channel openings. The sealing element for the at least two or a plurality of channel openings enables an inflow into a channel opening or outflow from a channel opening, wherein the at least two channel openings through the flexible bending sealing element can be designed independently of one another as an inlet valve or as an outlet valve. Also provided is a cylinder with at least one cylinder piston and an air compressor with such a cylinder.

17 Claims, 4 Drawing Sheets

(56) References Cited

U.S. PATENT DOCUMENTS

| | | | | |
|---|---|---|---|---|
| 1,539,127 | A | * | 5/1925 | Lipman ............... F04B 39/0016 137/512.1 |
| 1,620,870 | A | * | 3/1927 | Carrey .................. F04B 27/02 417/258 |
| 3,428,081 | A | * | 2/1969 | Jones ................ F04B 39/0016 137/516.21 |
| 3,547,561 | A | * | 12/1970 | Lavon ............... F04B 39/1046 417/488 |
| T946,012 | I4 | * | 5/1976 | Willis ............... F04B 39/0016 417/550 |
| 4,842,489 | A | * | 6/1989 | Lucisano ............ F04B 33/005 417/238 |
| 6,514,058 | B1 | * | 2/2003 | Chou ................ F04B 39/0016 417/313 |
| 7,275,477 | B1 | * | 10/2007 | Chen ................. F04B 39/0005 417/550 |
| 7,351,044 | B2 | * | 4/2008 | Antufjew ............ F04B 25/005 417/545 |
| 7,491,040 | B2 | * | 2/2009 | McCombs ............ F04B 35/04 417/312 |
| 9,115,807 | B2 | * | 8/2015 | Wang ........................ F16J 1/12 |
| 9,956,730 | B2 | * | 5/2018 | Kono ................ F04B 39/0094 |
| 10,041,485 | B2 | * | 8/2018 | Medici ................ F04B 39/121 |
| 2005/0175489 | A1 | | 8/2005 | Kitahara et al. |
| 2007/0077157 | A1 | * | 4/2007 | Chou ................ F04B 39/0016 417/437 |
| 2014/0227115 | A1 | * | 8/2014 | Ranker ................. F04B 39/14 417/321 |
| 2015/0377227 | A1 | * | 12/2015 | Muhle ................ F04B 39/0022 417/545 |
| 2020/0347842 | A1 | * | 11/2020 | Lee ....................... F04B 35/045 |
| 2021/0222684 | A1 | * | 7/2021 | Zhu .................... F04B 39/0094 |

\* cited by examiner

CYLINDER PISTON FOR AN AIR COMPRESSOR

CROSS-REFERENCE TO RELATED APPLICATION

This application claims priority from Application No. DE 10 2019 120 730.4 filed Jul. 31, 2019, the entire content of which is incorporated herein by reference.

FIELD OF THE INVENTION

The invention concerns a cylinder piston for an air compressor, in particular for a two-stage air compressor. Furthermore, the invention relates to a cylinder with at least one cylinder piston according to the invention.

BACKGROUND OF THE INVENTION

A large number of cylinder pistons are known from the prior art, which are used, for example, for compressing air or air mixtures in cylinder compressors. Such a compressor is used for the mechanical compression of various gases and is therefore referred to as a piston compressor. Such compressors can be used in the automotive industry, in particular for providing compressed air for dynamic air suspension.

With a piston compressor, when the piston is retracted, an inlet valve opens simultaneously and air or gas enters a boiler room. As soon as the piston retracts to the initial position, the valve closes again and the piston compresses the air in the boiler. The compressed medium can be released or stored through a valve in the adjacent compressed air tank towards the pressure side. Furthermore, at least one outlet valve can be arranged, which serves to discharge exhaust gases or air or gas volumes that are not required. Piston compressors can be driven in many different ways, e.g. by an electric motor.

In a two-stage piston compressor, two separate pistons are usually used, usually in a common cylinder, with one piston forming a low-pressure stage and one piston forming a high-pressure stage. Between the two stages, a pressure line controllable by non-return valves is provided to transport compressed air which is pre-compressed e.g. to 5-8 bar in the low pressure stage into the high pressure stage, where it is further compressed to 15-18 bar pressure.

Usually the intake and exhaust valves are arranged in the compressor housing or in the cylinder head or cylinder base. The inlet and outlet valves are designed as separate valves. On the one hand, this means that the installation space required for the valves must be available, and on the other hand, there is a large dead space volume in a compressor stage.

DE 44 29 097 A1, for example, shows a piston compressor with a piston which has a passage for the gaseous medium to be sucked in from the underside of the piston. The passage forms an inlet valve which opens when the piston moves down and closes when it moves up. The cover is designed as a flat metal ring in the form of an inlet valve cover. Since the cover is designed as a metal ring and thus as a rigid element, all openings are always opened or closed at the same time. A simultaneous formation of an opening as an inlet valve and another opening as an outlet valve is therefore not possible.

DE 103 30 366 A1 discloses a piston compressor, at least one inlet valve being integrated in the piston. The inlet valve is formed between an outer circumference of a spring element and a contact surface. The inlet valve is opened or closed via the spring element. The spring element is comparable to DE 44 29 097 A1 disc-shaped. It is not possible to open and close several openings independently of one another. DE 103 92 502 T5 also shows a piston compressor in which several openings are integrated in the piston. The openings are opened or closed via the suction valve. This means that all openings are set to the same valve type simultaneously and depending on each other.

DE 23 11 048 A shows a piston compressor which has at least one opening in the piston as an inlet valve. The inlet valve is designed as a valve disc resting on the top of the piston and consists of corrosion-resistant material, for example aluminum, brass or zinc. All openings can be released at the same time via the inlet valve and therefore only dependent on one another.

The object of the invention is therefore to propose a cylinder piston which overcomes the above-mentioned advantages. In particular, installation space is to be saved and unnecessary dead space volumes are to be avoided.

This object is achieved by a cylinder piston and a cylinder as disclosed herein. Advantageous further developments of the invention are also disclosed.

SUMMARY OF THE INVENTION

The object of the invention is a cylinder piston for an air compressor, in particular for a two-stage air compressor, wherein at least two channel openings are integrated in the piston surface of the cylinder piston, which are designed as an inlet valve and/or as an outlet valve for air in a compression chamber of the cylinder. This allows the two valves, i.e. the inlet valve and the outlet valve are implemented in a single channel opening. An inlet valve and an outlet valve can be formed by only one type of bore. The two valves can be quasi merged or combined. Thus two functional directions are conveyed by one component.

It is proposed that a coherent, one-piece and flexible bending sealing element is provided inside or covering the channel openings, wherein the sealing element for the at least two or a plurality of channel openings enables an inflow into a channel opening or outflow from a channel opening, wherein the at least two channel openings through the flexible bending sealing element can be designed independently of one another as an inlet valve or as an outlet valve.

Advantageously, the two channel openings can be designed independently of one another as an inlet valve or as an outlet valve. One channel opening can be designed particularly advantageously as an outlet valve, while the other channel opening is designed as an inlet valve.

A separate flexible bending sealing element can be provided for each channel opening. This makes it possible, for example, for each of the channel openings to be designed flexibly as an inlet valve or as an outlet valve if one or more channel openings are present. In particular, the flexible bending sealing element can be designed to be flat. When forming an inlet valve or an outlet valve, the sealing element can be deflected from the flat position and lie against a contact surface in the opposite direction and seal the channel opening.

Preferably, the sealing element is reversible in such a way that it returns to the initial position, in particular by itself, after the deflection. The sealing element can be arranged in the region of the piston surface. Likewise, the sealing element can be arranged centrally at any position over the cross section of the channel opening. It is also conceivable to arrange more than one sealing element within a channel opening. For example, two flexible bending sealing elements can be arranged at any position in a respective channel opening.

A coherent, in particular one-piece, flexible bending sealing element for the at least two or more channel openings enables an inflow into a channel opening or outflow from a channel opening, wherein the at least two openings can be formed independently of one another as an inlet valve or as an outlet valve by the flexible bending sealing element. If two channel openings are present, a flexible bending sealing element can be formed in one piece in such a way that it covers at least two channel openings and, for example, spans the distance between the two channel openings so to speak. The shape of the sealing element can be adapted to the cross-sectional shapes of the channel opening. In the other area, for example between the two channel openings, the sealing element can be shaped as desired. An assembly of the sealing element to form non-return valves is thus simplified. The sealing element in the region of the channel openings can preferably be shaped in such a way that deflection of the sealing element is only possible in the region of the channel openings, and preferably independently for each region of each channel opening. It is advantageous if the sealing element is slim in the remaining area and remains in the rest position. In the area of the channel openings, the flexible bending sealing element can be designed, for example, as a reversible non-return membrane.

The advantage is also that the valves are installed or integrated directly on the piston surface, i.e. in the cylinder piston. This enables the overflow channel to be decoupled. Furthermore, the dead space volume in the compressor stage can be reduced, since the valves are directly connect to the area of the compressed air or the compressed gas and no additional bores are provided in the cylinder wall for a channel routing.

The piston compressor system or the piston compressor can be optimized by the proposed so-called component combination. The proposed design of the cylinder piston can be used, for example, for a compressor in the automotive sector, in particular for the compressed air supply of an air spring system. Significant advantages can be an increase in efficiency of the compressor, whereby the moving mass can be reduced. Furthermore, components are saved, which also results in a reduced assembly effort. The reduced component size is also advantageous since the areas in the cylinder, in which the valves are normally arranged, are no longer required The channel opening can preferably be oriented essentially parallel to a direction of movement of the cylinder piston. The channel opening can run from the piston surface, i.e. extend from an outer surface of the cylinder piston to an opposite surface of the cylinder piston in the direction of the piston. In this case, the channel opening is preferably designed as a type of bore, in particular as a continuous bore. The channel opening can have a round cross section. Over the length of the channel opening, i.e. over the length of the bore, it can have a constant cross section. A variable cross section, for example a conical shape of the cross section, is also conceivable, or a recess for insertion of a non-return valve element.

The at least one channel opening can be arranged at any position in the piston surface or in the cylinder piston. The channel opening preferably has a maximum cross-sectional dimension that is many times smaller than the cross-sectional dimension of the cylinder piston.

In a preferred embodiment, the at least one channel opening can provide a connection between a first compressor stage and a second compressor stage of a two-stage piston compressor, or a connection to an air intake area, or a connection to a compressed air outlet. As a result, the proposed cylinder piston can be used as a high-pressure piston in a high-pressure stage. It is also conceivable that the cylinder piston forms a low-pressure piston. Both high-pressure and low-pressure pistons are advantageously designed with a channel opening, wherein an outlet valve is formed in the low-pressure piston and an inlet valve is formed in the high-pressure piston.

In a preferred embodiment, the at least one channel opening can be designed as a non-return valve. Since the non-return valve is integrated directly into the cylinder piston, a dead space volume can be reduced. This can improve the response time of the non-return valve.

In a preferred embodiment, more than two channel openings can be integrated in the cylinder piston, each of which can be designed as an inlet valve or as an outlet valve, wherein in particular through the connected sealing element, one channel opening can be designed as an inlet valve and another channel opening as an outlet valve. For example, three channel openings, i.e. two bores, can be arranged in the cylinder piston. These can, for example, be constructed identically. It is also conceivable that two channel openings are identical in construction and another channel opening has a different geometry in cross section and over the course of the channel opening or bore. If there are three channel openings in the cylinder piston, two channel openings can be designed as an inlet valve and one channel opening as an outlet valve. It is also conceivable that the respective channel opening can be designed as an inlet and an outlet valve. The respective channel opening can be used flexibly.

In a further embodiment, three channel openings can be arranged in the cylinder piston, wherein for example, two channel openings are designed as an inlet valve and one channel opening as an outlet valve. The outlet valve can, for example, have a smaller cross section than an inlet valve, since in particular a large-area air inlet is to be ensured. It is also conceivable that more than three channel openings or bores are arranged in the cylinder piston. The sum of the cross sections of the channel openings should be chosen in such a way that the mechanical stability of the cylinder piston itself is not weakened. The channel openings can be arranged at any position in the cylinder piston. The channel openings are preferably arranged circumferentially at substantially the same spacing from one another along an inner circumference. In particular, the two inlet valves can be arranged in the cylinder piston in such a way that an essentially balanced or symmetrical air inlet with respect to the piston surface can be ensured.

In a preferred embodiment, the flexible bending sealing element can be used as a reversible non-return membrane of a non-return valve to allow an inflow or outflow from the at least one channel opening. The sealing element can be designed, for example, as a flexible membrane, in particular a reversible non-return membrane. The sealing element can be arranged in the area of the piston surface. Likewise, the sealing element can be arranged centrally at any position over the cross section of the channel opening. It is also conceivable to arrange more than one sealing element within a channel opening. For example, two flexible bending sealing elements can be arranged at any position in a respective channel opening.

In a preferred embodiment, the flexible bending sealing element can be designed as a non-return membrane. If there are several channel openings, the direction of the non-return valve can be selected independently for each channel opening. In this case, for example, a separate non-return membrane can be arranged at each channel opening. It is also conceivable to form a coherent membrane for all existing channel openings, which reaches each of the channel openings. The connection areas, in which the membrane is arranged between the channel openings should be as slim as possible or independent of the geometry of the respective channel opening, so that the membrane can remain in this area, even if there is deflection in the area of at least one channel bore.

In a preferred embodiment, the flexible bending sealing element can be fixed, in particular pressed, to the piston surface of the cylinder piston via a retaining plate in such a way that a closing or opening movement of the flexible bending sealing element in the region of the channel opening is made possible. The retaining plate can preferably serve to ensure that the flexible bending sealing element, for example a membrane, remains flat in the area between the channel openings, even if the sealing element is deflected in the area of at least one channel opening and allows air to pass through. The retaining plate can be arranged, for example, in the area between the channel openings. The retaining plate is preferably flat and in the form of a sheet. This means that the retaining plate has a small thickness. The retaining plate can, for example, be screwed to the cylinder piston and essentially cover the piston surface. This can be achieved by screwing the retaining plate onto the piston surface. It is also conceivable that the retaining plate is at least partially bonded to the sealing element and the sealing element to the piston surface. It is also conceivable that the retaining plate is welded to the cylinder piston. The retaining plate can be designed, for example, in several parts, so that all areas between the existing channel openings can be reached. The elements preferably lie in the following order: cylinder piston, flexible bending sealing element, retaining plate.

In a preferred embodiment, the retaining plate in the area of the at least one channel opening can have a recess, which has a different diameter depending on the function of the channel opening as an inlet valve or outlet valve in order to form a diameter of an inlet opening of the inlet valve or a diameter of a stop ring of the outlet valve. If the diameter of a recess in the retaining plate is, for example, larger than the diameter of a channel opening, the sealing element can be deflected through the recess in the direction of the retaining plate. As a result, a valve direction can be provided which, for example, forms an inlet valve. If, on the other hand, the diameter of a recess in the retaining plate is smaller than the diameter of a channel opening, the sealing element can seal the channel opening by deflecting it in the direction of the retaining plate and cannot expose it and form an outlet valve. As a result, a kind of stop ring can be formed for the sealing element. Such a channel opening can consequently not represent an inlet valve with a valve direction in the case described above. The channel opening, on the other hand, could form an outlet valve, it being possible to deflect the sealing element away from the retaining plate. This can be achieved, for example, by a recess in the piston surface to allow the sealing element to deflect in the direction of the piston surface. The recess could have a comparable dimension to a recess in the retaining plate, in particular if the two channel openings have the same cross sections and/or the same diameters.

In a preferred embodiment, the retaining plate can have a ring-shaped protruding outer edge which positively engages around a stepped outer contour of the cylinder piston and can preferably be received in a cup sleeve lying in the stepped outer contour. In this way, for example, the retaining plate can be pressed with the cylinder piston. Furthermore, the retaining plate can be attached to the cylinder piston by means of a cup sleeve, which can form a type of outer edge of the retaining plate in order to prevent the retaining plate from moving in the longitudinal or transverse direction, i.e. parallel to the piston surface. By additionally screwing the retaining plate onto the cylinder piston, the top sleeve can be positively clamped between the cylinder piston and the retaining plate.

In a preferred embodiment, the cylinder piston can have a cavity with a depth $t1$ on a surface at least around the channel opening. For example, the flexible bending sealing element, in particular a membrane, can be inserted into this cavity. As a result, the position of the sealing element on the piston surface can be secured against parallel displacement to the piston surface.

In a preferred embodiment, the flexible bending sealing element can be adapted to a shape of the cavity, wherein the depth $t1$ of the cavity corresponds in particular to a thickness $t2$ of the flexible bending sealing element, and preferably a boundary area of a channel opening serving as an outlet valve can be provided with a greater depth in the direction of the outlet channel, in order to provide a valve flap movement space of the flexible bending sealing element, or the diameter of the recess of the outlet valve can be designed to be so large, at least in the region of the channel opening, in order to provide a valve flap movement space. If the depth of the cavity corresponds to a thickness of the flexible bending sealing element, the sealing element can be virtually sunk into the cavity. When a retaining plate is placed, it can rest on the entire surface of the sealing element and on the piston surface, even if the holding plate is flat. If the sealing element should to be deflected not in the direction of the retaining plate but in the direction of the piston surface, it is advantageous if the cavity with depth $t1$ is formed in the region at least partially deeper than the thickness $t2$ of the flexible bending sealing element. In this way, the sealing element can be deflected in the direction of the cavity and open the valve in the channel opening.

In a preferred embodiment, the flexible bending sealing element can be finger-shaped and comprise a number of fingers with finger ends that corresponds to the number of channel openings, the finger ends being able to reach and cover the at least two channel openings, in particular the more than two channel openings, as a non-return valve. Preferably the sealing element in the region of the channel opening, i.e. in the area of the finger ends, is designed with a larger dimension than in the areas between the channel openings, i.e. in the connecting areas. Thus, the connecting areas between at least two channel openings, which form the fingers, so to speak, can be slimmer than the finger ends, which are located in the area of the channel openings. The finger ends can have the shape of the channel openings, but with an enlarged cross section. This can ensure that the flexible bending sealing element in the region of the channel opening has sufficient flexibility and, for example, can also act or be designed as a reversible non-return membrane.

Furthermore, the object of the invention is a cylinder with at least one cylinder piston according to the invention.

It is proposed that, depending on the air ratio, air flows of air or an outflow of compressed air occurs through the inlet valve or outlet valve of the corresponding channel opening. The cylinder with at least one cylinder piston has the same features and advantages as described above for the cylinder piston.

In a preferred embodiment of the cylinder, the at least one cylinder piston can have three channel openings, wherein two channel openings can be designed as inlet valves and one channel opening as outlet valve. The two inlet valves can each have a larger diameter than the outlet valve. The inlet valves are preferably arranged in the cylinder piston in such a way that an inflow that is symmetrical with respect to the piston surface or with respect to the diameter of the cylinder piston can take place through the inlet valve.

In a secondary aspect, an air compressor based on a piston-compressor principle is proposed, wherein the cylinder is designed according to the aforementioned embodiment with a cylinder piston with integrated channel opening as an inlet and/or outlet valve for air in a compression chamber of the cylinder.

BRIEF DESCRIPTION OF THE DRAWINGS

Further advantages result from the available drawings and drawing descriptions. The drawings show examples of the invention. The drawings, the description and the claims contain numerous features in combination. It is advisable for the skilled person to look at the features individually and to combine them into further useful combinations.

It shows.

The same or similar components are numbered with the same reference symbols in the figures.

DETAILED DESCRIPTION OF THE INVENTION

Figure 1:
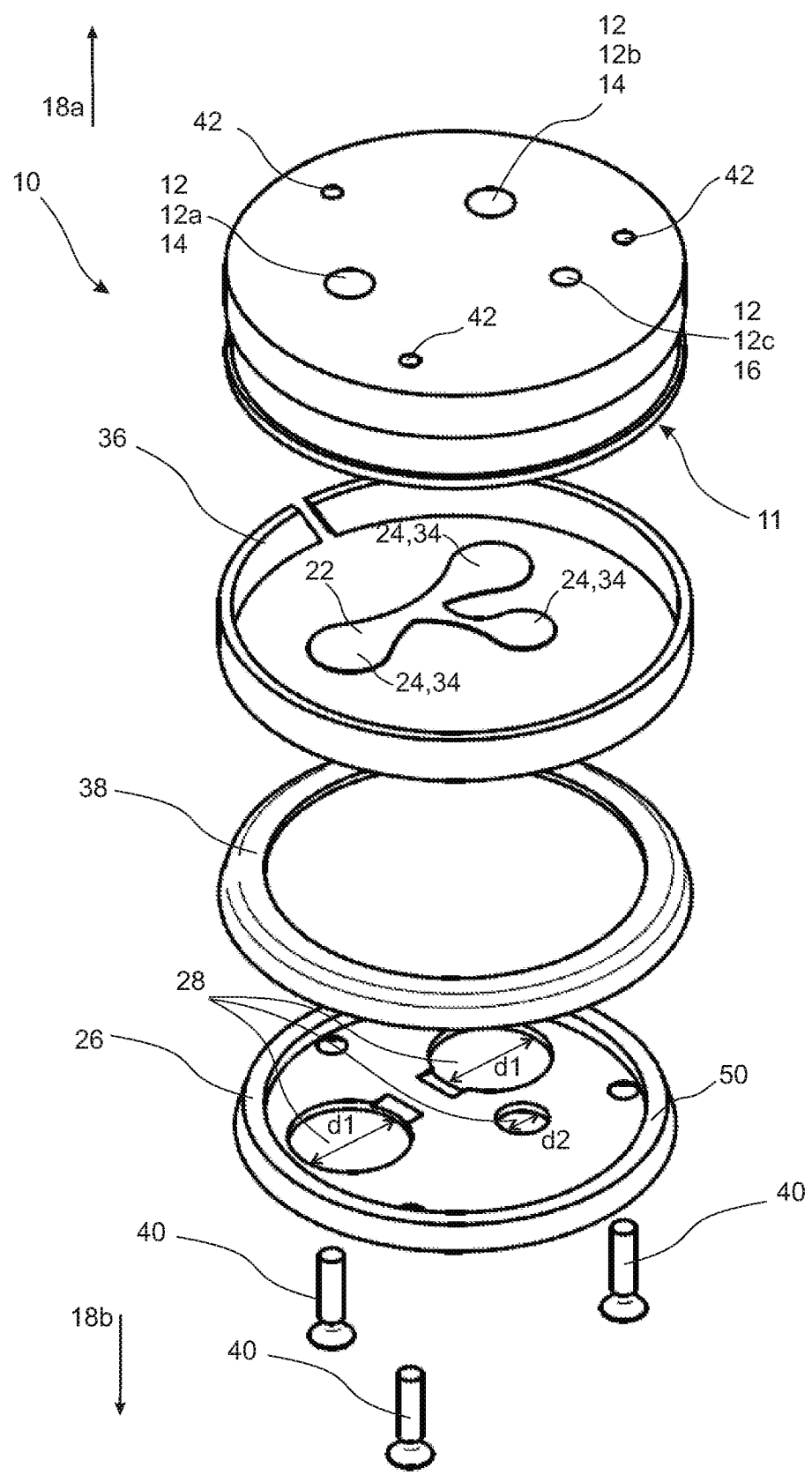
FIG. 1 shows an embodiment of a cylinder piston according to the invention in an exploded view.

FIG. 1 shows an embodiment of a cylinder piston 10 according to the invention in an exploded view. The cylinder piston 10 is shown at the upper edge of the picture, which has three channel openings 12a, 12b, 12c. The two channel openings 12a, 12b are identical formed, while the third channel opening 12c has a smaller diameter. The channel openings 12a, 12b, 12c run essentially perpendicularly from the piston surface 11 through the cylinder piston 10. In this case, vertical means essentially parallel to a direction of movement of the cylinder piston 10 in a cylinder (not shown). The illustration further shows a piston guide ring 36 which is arranged in a cavity on the circumferential side wall of the cylinder piston 10. In this embodiment, a flexible bending sealing element 22 is finger-shaped and has three finger ends 34 which correspond to the positions of the channel openings 12a, 12b, 12c. When installed on the respective channel openings 12a, 12b, 12c, the three finger ends 34 can serve as a non-return membrane 24. The illustration further shows a cup seal 38, which can be arranged in the installed state between a retaining plate 26 and the cylinder piston 10. The retaining plate 26 has a ring-shaped protruding outer edge 50 which engages in the cup seal 38 in the installed state and is held by this in a congruent shape. In this embodiment, the retaining plate 26 is screwed onto the cylinder piston 10 via three fixing screws 40. In order to form valves in the channel openings 12a, 12b, 12c, a recess 28 is arranged at the position in the retaining plate 26 respectively, at which a channel opening 12a, 12b, 12c is located. The recesses 28 have the diameter d1 for the two inlet valves 14. For the outlet valve 16, the recesses 28 have the diameter d2 which is smaller than the diameter d1. The size of the diameter d1 enables the flexible bending sealing element 22 to be deflected through the recesses 28. In this way, the two inlet valves 14 can be formed. The recesses 28 with the diameter d2, on the other hand, prevent the flexible bending sealing element 22 from being deflected in the direction of the recess 28 or in the direction of the retaining plate 26, thus defining a stop ring. The flexible bending sealing element 22 at the finger end 34 of the channel opening 12c can consequently only deflect in the direction of the piston surface 11, in which a corresponding recess is designed for this purpose as a valve flap movement space. A sufficient cavity is preferably formed in the piston surface 11 (not visible in this perspective view). As a result, the channel opening 12c can form an outlet valve 16, through which air can flow in the opposite direction with respect to the two intake valves 14. In this illustration, a first compressor stage 18a and a second compressor stage 18b of a two-stage piston compressor can be arranged in the direction of the arrow. In particular, the piston compressor can be used to supply a vehicle compressed air system, in particular for an air spring system, brake system, etc.

Figure 2:
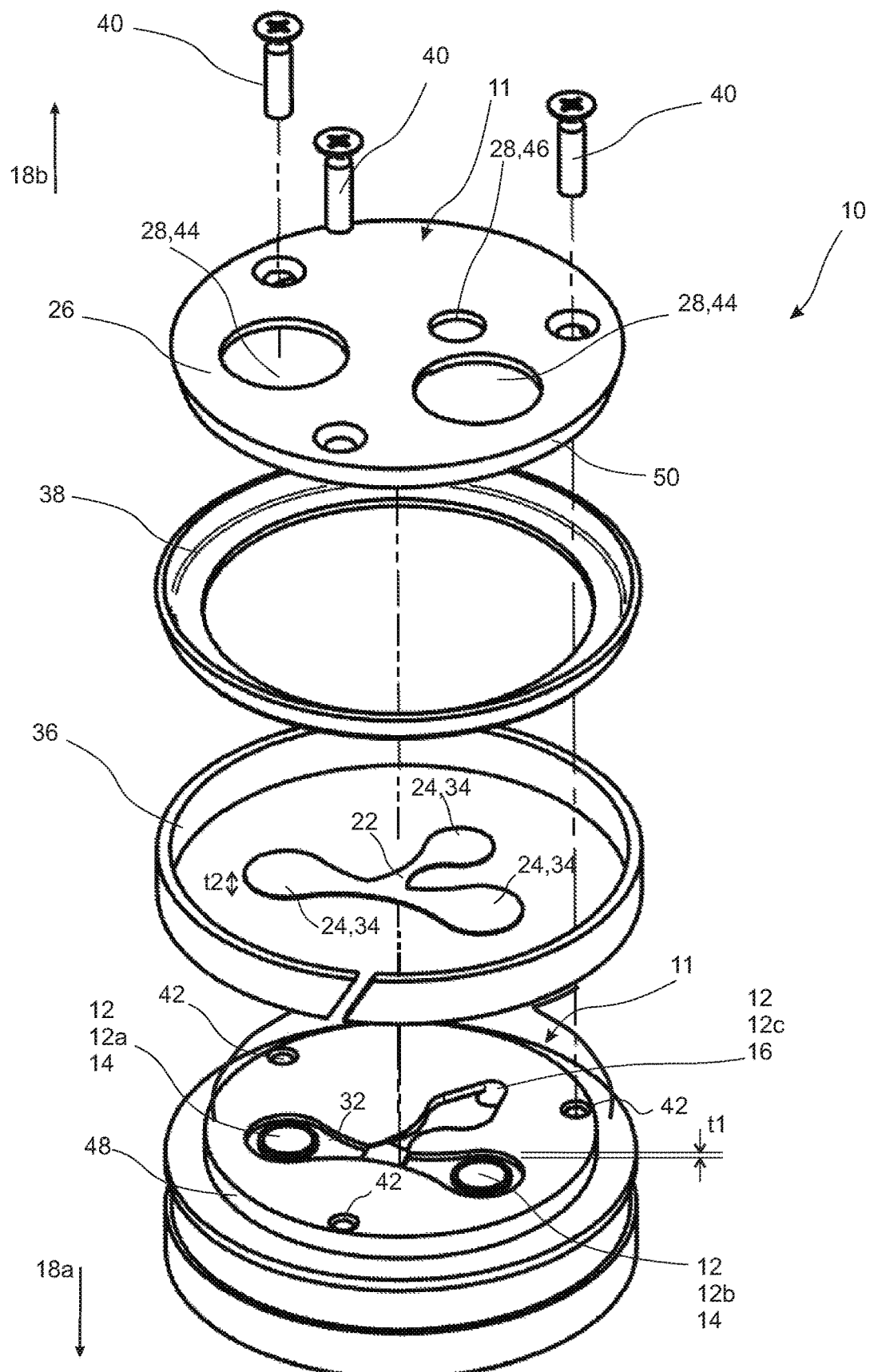
FIG. 2 shows a further illustration of the embodiment from FIG. 1 in a view rotated by 180°.

A further illustration of the embodiment from FIG. 1 in a view rotated by 180° is shown in FIG. 2. In contrast to the illustration in FIG. 1, the second compressor stage 18b is shown in the upper region of the illustration, and the first compressor stage 18a in the lower region of the illustration. Consequently, the surface 30 of the piston surface can be viewed directly in this exploded view. As a result, the cavity 32 with depth t1 is clearly visible. In this embodiment, the cavity 32 is finger-shaped and equivalent to the flexible bending sealing element 22 with the thickness t2. The finger ends 34 of the so to speak three fingers are arranged quasi at the corners of a virtual triangle. In the area of the finger ends 34, the cavity 32 is widened in cross section, so that a recessed area is formed by the cavity 32 in the area around the respective channel opening 12a, 12b, 12c. In a connecting area between the channel openings 12a, 12b, 12c, the cavity 32 is formed with a reduced cross section. The finger ends 34 of the flexible bending sealing element 22 can thus flexibly deflect from the rest position and form a non-return membrane 24. The cavity 32 provides in particular a valve flap movement space around the channel opening 12c. For the two inlet valves 14, the valve flap movement space is formed by the recess 28 in the retaining plate 26, through which openings 44 are formed. For the outlet valve 16, in which the non-return valve must form in the opposite direction to the non-return valve on the inlet valve 14, the valve flap movement space is provided by extending the cavity 32 in the piston surface 11 by the channel opening 12c. As a result, the finger end 34 of the flexible bending sealing element 22 at the outlet valve 16 can deflect in the direction of the piston surface 11 from a rest position and form a non-return membrane 24. A movement of the flexible bending sealing element 22 in the direction of the retaining plate 26 is prevented in that the recess 28 in the area of the outlet valve 16 has a smaller diameter d2 than the recesses 28 with diameter d1 for the inlet valves 14, so that a stop ring 46 is formed. The depth t1 of the cavity 32 can correspond to the thickness t2 of the flexible bending sealing element 22, so that when the retaining plate 26 is applied, it rests over the entire surface of the flexible bending sealing element 22 and on the piston surface 11. The other features correspond to those which have already been discussed with reference to FIG. 1. For this reason, these features will not be discussed further here.

Figure 3:
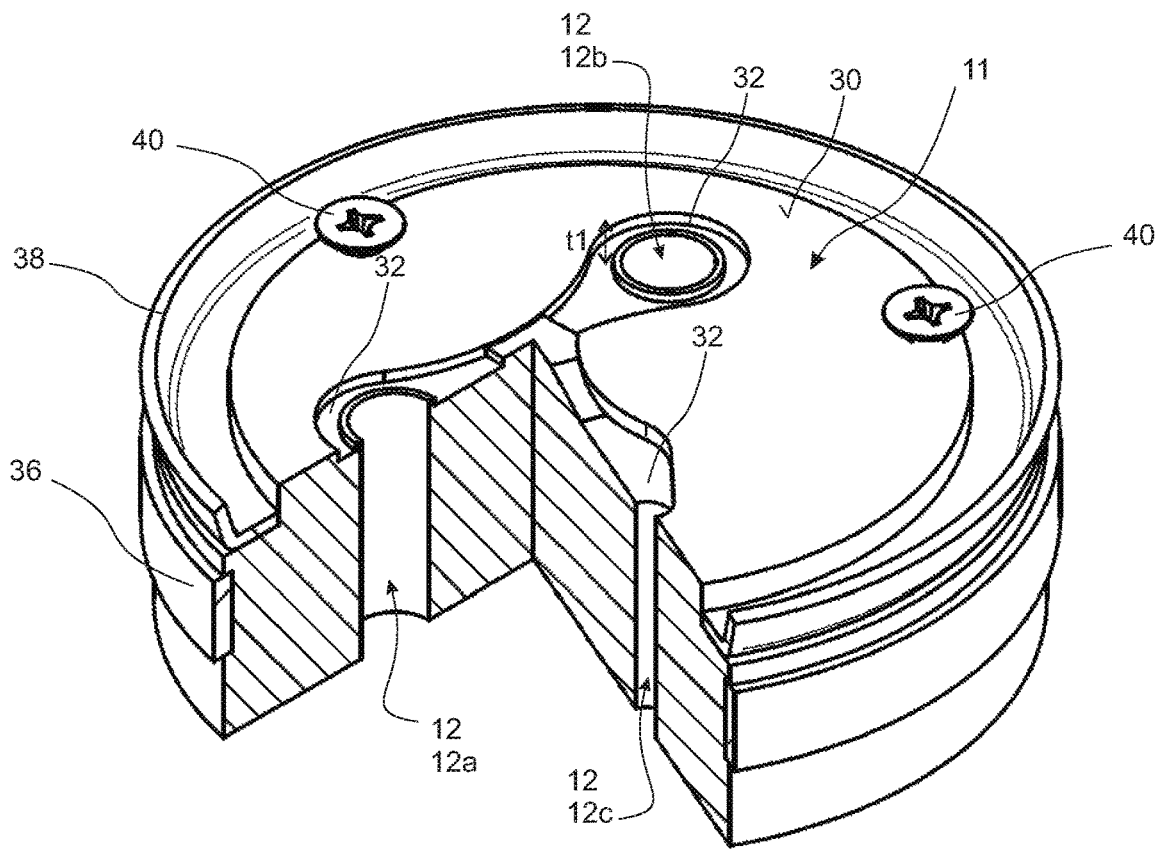
FIG. 3 shows a further illustration of the embodiment from FIG. 1 in an isometric illustration without a retaining plate and partially cut.

FIG. 3 shows a further illustration of the embodiment from FIG. 1 in an isometric view without a retaining plate 26 and without a flexible bending sealing element 22 and partly cut. The illustration corresponds quasi to the embodiment from FIG. 2, although this is not shown in the form of an exploded drawing. Furthermore, the illustration is shown partly cut, so that the two channel openings 12a, 12c are visible in longitudinal section. The illustration shows the situation before the application of the flexible bending sealing element 22 and before the application of the retaining plate 26. The surface 30 of the piston surface 11 is thereby visible. The fixing screws 40 are already shown for illustration purposes only. The flexible bending sealing element 22 can then be inserted into the cavity 32. The thickness t2 of the flexible bending sealing element 22 can correspond to the depth t1 of the cavity 32, so that the flexible bending sealing element 22 is flush with the piston surface 11 on the upper side.

Figure 4:
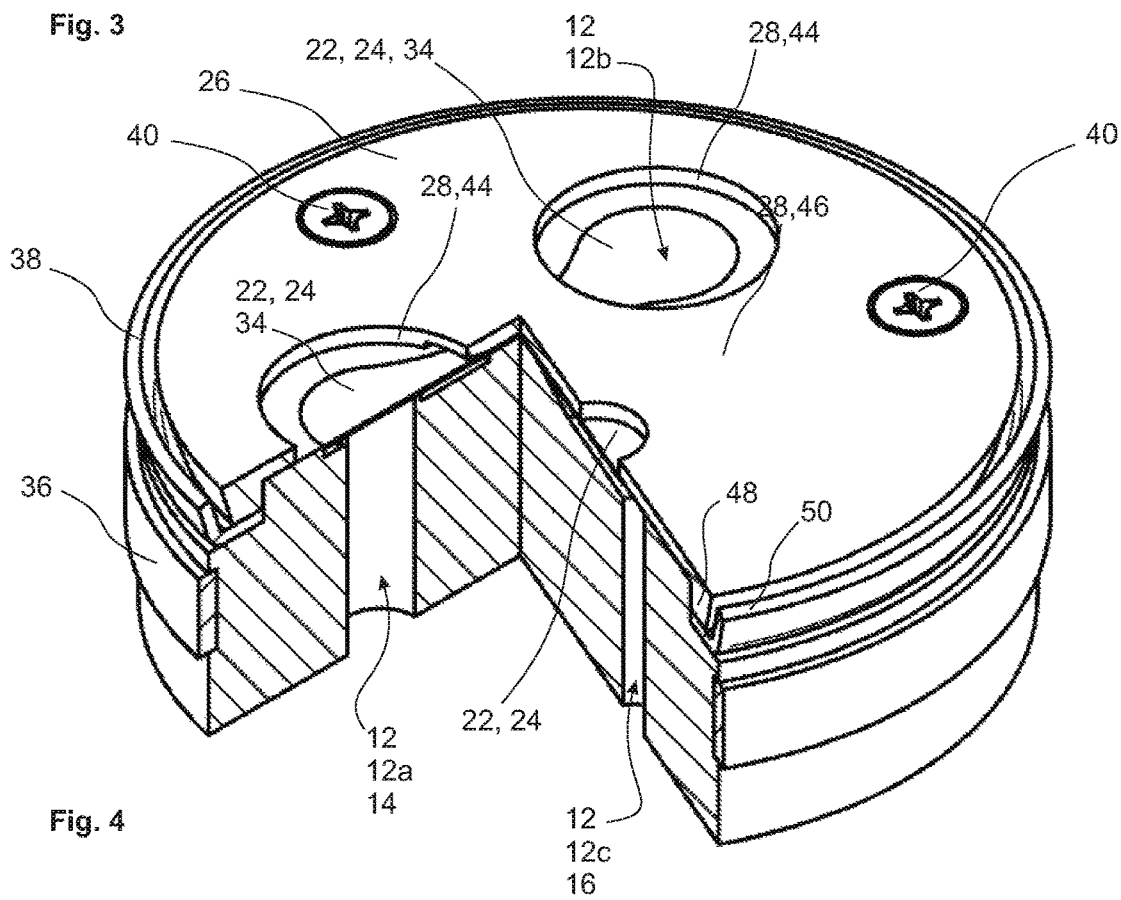
FIG. 4 shows the representation from FIG. 3 with the retaining plate.

The illustration from FIG. 3 with the retaining plate 26 and with the flexible bending sealing element 22 is shown in FIG. 4. It is clearly visible that the flexible bending sealing element 22 corresponds to the shape of the cavity 32. Furthermore, it can be seen very clearly that the recess 28 at the channel opening 12a is designed larger than the finger end 34, so that the flexible bending sealing element 22 in the region of the finger end 34 can move upward from the rest position in the illustration. An inlet valve 14 can thereby be formed. In the area of the channel opening 12c the recess 28 is designed to be so small that the flexible bending sealing element 22 in the area of the finger end 34 is touched by the retaining plate 26 in the upper area in the illustration. This prevents a deflection of the flexible bending sealing element 22 in one direction in the illustration upwards. It is therefore possible to form a valve flap movement space by means of a cavity on the piston surface 11 in such a way that a deflection of the flexible bending sealing element 22 from a rest position is made possible in the illustration downward. As a result, an outlet valve 16 can be formed, which allows a flow direction opposite to the flow direction in the inlet valve 14. The valve flap movement space is not shown in this illustration. Furthermore, it can be seen that the retaining plate 26 has a ring-shaped protruding outer edge 50 which surrounds a stepped outer contour 48 of the cylinder piston in a form-fitting manner. Furthermore, a cup seal 38 is arranged between the retaining plate 26 and the piston surface 11.

Figure 5:
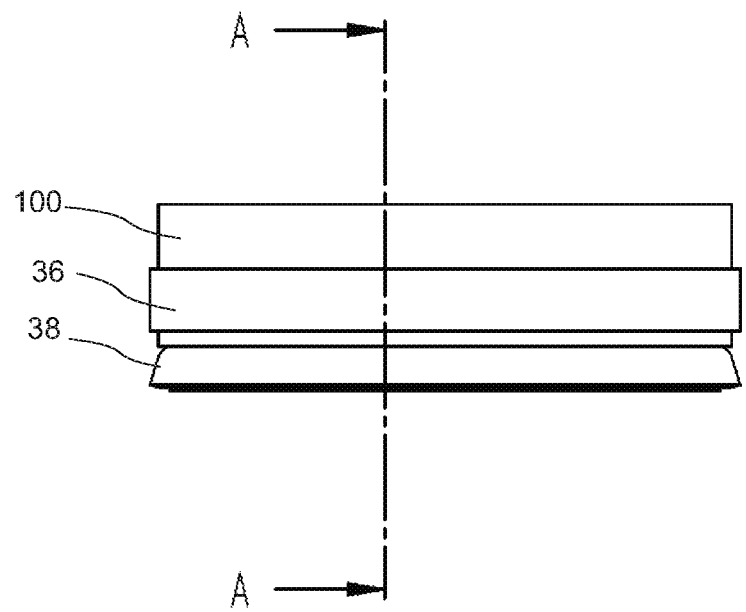
FIG. 5 shows a further view of the embodiment from FIG. 1 in a side view.

FIG. 5 shows a further view of the embodiment from FIG. 1 in a side view. The arrangement of the piston guide ring 36 and the cup seal 38 can be seen. On the underside as well as the upper side of the illustration, the cylinder piston 10 is flat. Consequently, neither the fixing screws 40 nor other components protrude beyond the retaining plate 26 on the underside.

Figure 6:
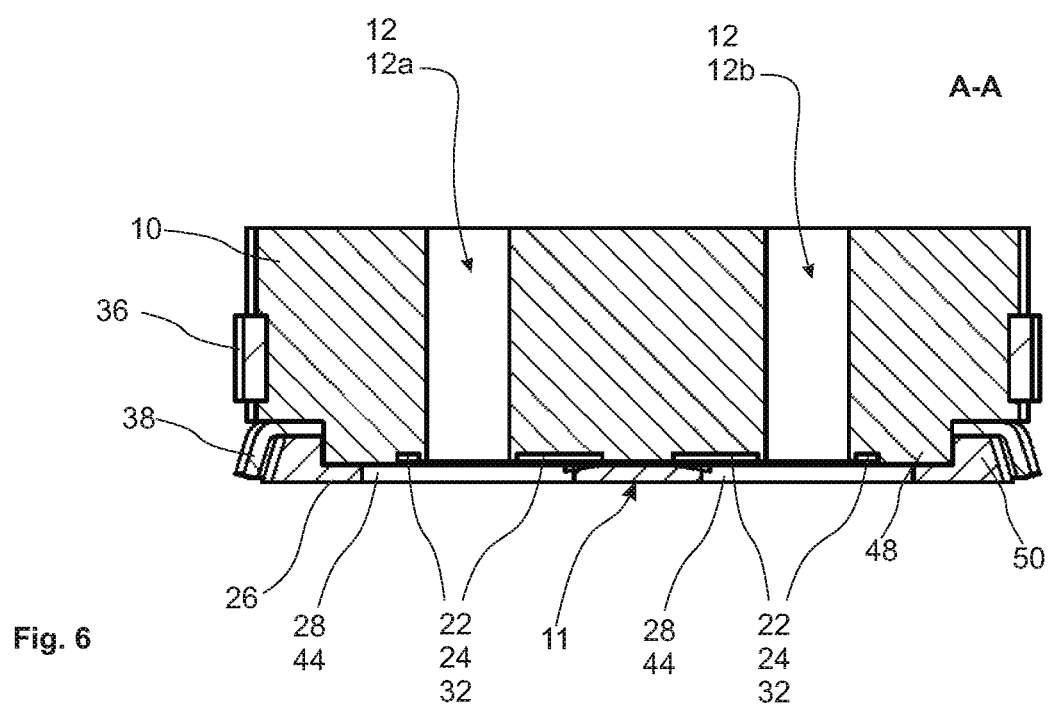
FIG. 6 is a sectional view of FIG. 5.

A sectional view along the sectional plane A-A from FIG. 5 is shown in FIG. 6. It can be seen that the channel openings 12 are formed with a constant cross section over the length. The cut is made such that the flexible bending sealing element 22 is shown partially cut in the connecting area between the two channel openings 12. As a result, the flexible bending sealing element 22 appears asymmetrical around the area of the channel openings 12.

The illustrations show only one possible embodiment of the cylinder piston 10 according to the invention. Of course, this is not limited to the embodiment shown. Deviating from the illustrated embodiment, it is conceivable, for example, to arrange only one channel opening 12, two channel openings 12 or more than three channel openings 12 in the cylinder piston 10. The shape of the flexible bending sealing element 22 can also differ from the geometry shown. For example, the flexible bending sealing element 22 could be designed in several parts. Likewise, the cross-sectional shape and the arrangement of the channel openings 12 can also vary and differ from the illustrated embodiment.

LIST OF REFERENCE NUMERALS 10 cylinder piston
11 piston surface
12 channel opening
12a channel opening
12b channel opening
12c channel opening
14 inlet valve
16 outlet valve
18a first compressor stage
18b second compressor stage
20 non-return valve
22 Flexible bending sealing element
24 non-return membrane
26 retaining plate
28 recess
30 surface
32 cavity
34 finger ends
36 piston guide ring
38 cup seal
40 fixing screw
42 opening for fixing screw
44 opening
46 stop ring
48 stepped outer contour of cylinder piston
50 ring-shaped protruding outer edge of retaining plate
t1 depth of cavity
t2 thickness of flexible sealing element
d1 diameter of recess of inlet valve/inlet opening
d2 diameter of recess of outlet valve/stop ring

The invention claimed is:

1. A cylinder piston for an air compressor, comprising:
a piston surface having at least two channel openings integrated therein, the at least two channel openings forming at least one inlet valve and at least one outlet valve respectively;
a coherent, one-piece and flexible bending sealing element provided inside or covering the at least two channel openings, the sealing element enabling an inflow into at least one of the channel openings or an outflow from at least one of the channel openings;
wherein the at least two channel openings being designed independently of one another as an inlet valve or as an outlet valve, by the flexible bending sealing element,
wherein the flexible bending sealing element is fixed to the piston surface of the cylinder piston via a retaining plate in such a way that a closing or opening movement of the flexible bending sealing element in a region of the respective at least two channel openings is made possible, and
wherein the retaining plate has a respective recess in the region of each of the at least two channel openings, to provide the at least one inlet valve and the at least one outlet valve, the respective recesses having a different diameter to form a diameter of an inlet opening of the at least one inlet valve or a diameter of a stop ring of the at least one outlet valve, and
wherein
the diameter of the respective recess is larger than the diameter of the respective channel opening and the sealing element is configured to be deflected through the recess in the direction of the retaining plate to provide the at least one inlet valve, and
the diameter of the respective recess is smaller than the diameter of the respective channel opening and the sealing element is configured to seal the channel opening by deflecting it in the direction of the retaining plate to provide the at least one outlet valve.

2. The cylinder piston according to claim 1, wherein the channel openings each provide:
a connection between a first compressor stage and a second compressor stage of a two-stage air compressor; or
a connection to an air intake area; or
a connection to a compressed air outlet.

3. The cylinder piston according to claim 1, wherein at least one of the channel openings is designed as a non-return valve.

4. The cylinder piston according to claim 1, wherein the at least two channel openings comprise more than two channel openings integrated in the cylinder piston, each of the more than two channel openings formed as an inlet valve or as an outlet valve.

5. The cylinder piston according to claim 4, wherein one of the at least two channel openings is formed as the inlet valve and another one of the at least two channel openings is formed as the outlet valve simultaneously through the coherent sealing element.

6. The cylinder piston according to claim 1, wherein the flexible bending sealing element comprises a reversible non-return membrane of a non-return valve so as to enable an inflow or outflow from the at least two channel openings.

7. The cylinder piston according to claim 1, wherein the flexible bending sealing element is a non-return membrane.

8. The cylinder piston according to claim 1, wherein the retaining plate has an annular protruding outer edge which engages around a stepped outer contour of the cylinder piston.

9. The cylinder piston according to claim 8, wherein the annular protruding edge is received in a cup sleeve lying in the stepped outer contour of the cylinder piston.

10. The cylinder piston according to claim 1, wherein the cylinder piston has a cavity with a depth on a surface at least around one of the channel openings.

11. The cylinder piston according to claim 10, wherein the flexible bending sealing element is adapted to a shape of the cavity, the depth of the cavity corresponding to a thickness of the flexible bending sealing element.

12. The cylinder piston according to claim 11, wherein a boundary area of one of the at least two channel openings serving as an outlet valve is provided with a greater depth in a direction of the outlet channel in order to provide a valve flap movement space of the flexible bending sealing element.

13. The cylinder piston according to claim 11, wherein a diameter of a respective recess of the at least one outlet valve, at least in the region of the channel opening, is formed to be large enough to provide a valve flap movement space.

14. The cylinder piston according to claim 1, wherein the flexible bending sealing element is finger-shaped and comprises a number of fingers with finger ends which corresponds to the number of channel openings, wherein the finger ends reach and cover the at least two channel openings as a non-return membrane of the at least one outlet valve or the at least one inlet valve formed as a non-return valve.

15. A cylinder, comprising:
at least one cylinder piston according to claim 1;
wherein, depending on an air ratio, an inflow of air or an outflow of compressed air takes place through the inlet valve or outlet valve of the corresponding channel opening.

16. The cylinder according to claim 15, wherein the cylinder piston has three channel openings, wherein two channel openings are designed as inlet valves and one channel opening is designed as an outlet valve.

17. An air compressor comprising a cylinder according to claim 10.

\* \* \* \* \*